United States Patent
Llombart-Juan et al.

(10) Patent No.: US 7,130,645 B2
(45) Date of Patent: Oct. 31, 2006

(54) LOCATION-DEPENDENT INFORMATION REPRODUCTION WITH ADAPTATION OF A GEOGRAPHIC SELECTION PARAMETER

(75) Inventors: Nuria Llombart-Juan, Alboraya (ES); Heinz Gerhaeuser, Waischenfeld (DE); Olaf Korte, Igensdorf (DE); Roland Plankenbuehler, Nuernberg (DE); Alexander Zink, Stegaurach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 180 days.

(21) Appl. No.: 10/966,477
(22) Filed: Oct. 15, 2004

(65) Prior Publication Data

US 2005/0136947 A1    Jun. 23, 2005

Related U.S. Application Data

(63) Continuation of application No. PCT/EP03/04102, filed on Apr. 17, 2003.

(30) Foreign Application Priority Data

Apr. 18, 2002  (DE) ................................ 102 17 300

(51) Int. Cl.
*H04Q 7/20*  (2006.01)
(52) U.S. Cl. ................ 455/456.3; 455/414.1; 455/412.1; 455/456.5; 455/457; 701/208; 701/209; 701/201; 340/990
(58) Field of Classification Search ............ 455/456.3, 455/414.1, 412.1, 456.5, 457; 701/208–209; 701/201; 304/990
See application file for complete search history.

(56) References Cited

U.S. PATENT DOCUMENTS

| 5,717,392 A | 2/1998 | Eldridge |
| 6,266,608 B1 | 7/2001 | Pertz |
| 2004/0107046 A1 | 6/2004 | Zink |

FOREIGN PATENT DOCUMENTS

| DE | 44 45 582 C1 | 3/1996 |
| DE | 693 10 938 T2 | 5/1997 |
| DE | 19841169 C1 | 3/2000 |
| DE | 100 39 663 A1 | 3/2002 |
| EP | 0 756 153 A2 | 1/1997 |
| EP | 0 829 837 A1 | 3/1998 |
| EP | 0 994 448 A2 | 4/2000 |

*Primary Examiner*—Nick Corsaro
*Assistant Examiner*—Nicholas La
(74) *Attorney, Agent, or Firm*—Michael A. Glenn; Glenn Patent Group

(57) ABSTRACT

A method for providing an information unit to a user is described, wherein the information unit describes an object having a predetermined spatial relationship to the user. The method includes detecting a kind of movement or a position of the user. Depending on the detected kind of movement or the position of the user, a geographic selection criterion is adjusted, wherein, depending on the predetermined spatial relationship of object to user, the geographic selection criterion specifies whether the information unit is provided or not. If a location of the user is located such with respect to a geographic position of the user that the geographic selection criterion is met, the information unit for the object is reproduced. An advantage is that the concept may be employed in applications in which the user gets into different environments and situations which, in turn, require different geographic selection criteria.

7 Claims, 3 Drawing Sheets

LOCATION-DEPENDENT INFORMATION REPRODUCTION WITH ADAPTATION OF A GEOGRAPHIC SELECTION PARAMETER

CROSS-REFERENCE TO RELATED APPLICATION

This application is a continuation of copending International Application No. PCT/EP03/04102, filed on Apr. 17, 2003, which designated the United States and was not published in English.

BACKGROUND OF THE INVENTION

1. Field of the Invention

The present invention relates to a method and devices for the location-dependent provision and/or reproduction of information to a user.

2. Description of the Related Art

Systems for location-dependent information reproduction are known in the art and are employed, for example, in the area of museums for automatic tours through the museum. The information units to be reproduced describe various objects located at different locations. The systems have knowledge of the user location and of the locations of the information units. The selection of the information unit to be reproduced from the plurality of information units is performed via so-called selection criteria. These selection criteria include, among other things, geographic selection criteria and determine, for example, in which distance to the user an object may maximally be situated for the corresponding information unit to be included in the short list of information units to be selected, one of which, in turn, is finally to be reproduced. Each geographic selection criterion, such as the maximum distance of an object to the user, is designed for the specific application of the system, such as in the case of the museum visitor tour system for the corresponding conditions applying to a visit to a museum.

Current systems of the type described above fail when it is attempted to employ them in applications in which there are environmental and situational conditions that change and/or vary considerably, because in situations and/or environments for which they are not designed, they lead to a rather useless selection of information units to be reproduced. When the museum guide described above is employed in an outdoor museum, for example, in which the visitors walk both through exhibition rooms and along outdoor paths, the configuration of the geographic selection parameters to one of the two environments and/or situations, that is outdoors or indoors, leads to a rather useless selection in the respective other environment.

An example for a system of the type described above is described, for example, in DE 10039663 A1.

Accordingly, there is a need for systems for location-dependent information reproduction that may be employed universally and, in addition, lead to a more efficient selection of the information units to be reproduced.

DE 19841169 C1 describes a method and a device for the provision of informational data in connection with a GPS system. The informational data in a data carrier are reproduced depending on the current location data and the current movement speed data via an optical and/or acoustic output unit. More specifically, the selection of the information file to be reproduced from the provided information files is based on finding out first the relevant informational data for a certain distance ahead and then replaying them in the order that the next informational data to be replayed is the one which may be replayed at top priority in the time window until the forecast end point of its validity for the route. Accordingly, a sequential application of fixed selection criteria is used for the selection of information to be reproduced. First, a selection criterion is applied which, from all information, only selects those describing the objects that are relevant for a forecast path ahead and/or can be reproduced along a certain route segment. From this information, in turn, those with top priority are filtered out, wherein it is taken into account, however, that the user is going with a detected speed and that, therefore, the route segments concerned by the information are traveled through for different periods of time depending on speed, so that only that information is replayed that is sufficiently short with respect to its replay duration.

DE 69310938 T2 describes a system with electronic verbal tourist instructions. The system allows searching for information on database with respect to the immediate environment of a selected or determined position, and passing it on to the user, namely on request or automatically. On the one hand, upon request for information by the user, the system is capable of displaying suitable answers with respect to the respective vicinity with increasing magnitude of distance and/or listing them verbally. According to another mode of operation of the system, the information output to the user is performed automatically, thereby allowing the user to know the information hierarchically classified as the most important or most interesting one of the location where the system is located in the database. The objects described in the database have their precise locations in their description for location-dependent reproduction. Moreover, the information is stored such that a decision of access is permitted according to the degree of accuracy desired for the information.

SUMMARY OF THE INVENTION

It is the object of the present invention to provide a method and a device for providing an information unit to a user allowing a more universal employability and a more efficient information reproduction selection.

In accordance with a first aspect, the present invention provides a method for providing one of a plurality of available information units to a user, wherein the information units each describe an object at a respective location, wherein the method has the steps of a) detecting a geographic position of the user; b) iteratively determining such information units from the plurality of available information units that describe objects situated at locations which have a spatial relationship to the geographic position of the user which meets a geographic selection criterion, selecting an information unit to be reproduced to the user from the determined information units, and reproducing the selected information unit to the user; c) depending on a temporal behavior of the geographic position, a speed and/or a direction of movement of the user, adjusting the geographic selection criterion so that a subsequent selection process is performed with a different geographic selection criterion; wherein the method further has the step of d) prior to step c), detecting the position, speed and/or direction of movement of the user over a time window of predetermined duration to detect the temporal behavior; wherein step b) includes selecting those information units that describe objects at locations situated so that a distance of the geographic position of the user from the location of the object or an angle between the direction of movement of the user and a line running through the geographic position of the user and the location of the object is below or exceeds a selection parameter; wherein step b) further has the substeps of b1) evaluation of the detected temporal behavior in the time window of a predetermined time period to obtain a statistical characteristic or measure; and b2) adjusting the geographic selection criterion depending on the statistical characteristic, and wherein in step d) the temporal behavior is also determined over a further time window of a further predetermined time period which is longer than the time period of the predetermined time window, and wherein step b) further has the substeps of, prior to step b2), evaluation of the detected temporal behavior in the further time window to obtain a further statistical characteristic which is a further measure for changes in the temporal behavior; concluding a situation of the user from a plurality of predetermined situations based on the further statistical characteristic, wherein one or more values defining a functional connection between the selection parameter and the statistical characteristic are associated with each situation; wherein the adjustment of step b2) has the step of adjusting the selection parameter depending on the statistical characteristic on the basis of the functional connection defined by the value and/or values associated with the situation.

In accordance with a second aspect, the present invention provides a device for providing one of a plurality of available information units to a user, wherein the information units each describe an object at a respective location, wherein the device has a) a unit for detecting a geographic position of the user; b) a unit for iteratively determining such information units from the plurality of available information units that describe objects situated at locations which have a spatial relationship to the geographic position of the user which meets a geographic selection criterion, selecting an information unit to be reproduced to the user from the determined information units, and reproducing the selected information unit to the user; c) a unit for adjusting the geographic selection criterion depending on a temporal behavior of the geographic position, a speed and/or a direction of movement of the user, so that successive selection processes are performed with different geographic selection criteria; wherein the unit for detecting is formed to detect the position, speed and/or direction of movement of the user over a time window of predetermined duration to detect the temporal behavior; wherein the unit for iteratively determining, selecting and reproducing is formed such that the selection includes selecting those information units that describe objects at locations situated so that a distance of the geographic position of the user from the location of the object or an angle between the direction of movement of the user and a line running through the geographic position of the user and the location of the object is below or exceeds a selection parameter; wherein the device further has b1) a unit for evaluating the detected temporal behavior in the time window of a predetermined time period to obtain a statistical characteristic; and b2) a unit for adjusting the geographic selection criterion depending on the statistical characteristic, and wherein the unit for detecting is further formed to determine the temporal behavior also over a further time window of a further predetermined time period which is longer than the time period of the predetermined time window, and wherein the unit for iteratively determining, selecting and reproducing has the following units: a unit for evaluating the detected temporal behavior in the further time window to obtain a further statistical characteristic which is a further measure for changes in the temporal behavior; a unit for concluding a situation of the user from a plurality of predetermined situations based on the further statistical characteristic, wherein one or more values defining a functional connection between the selection parameter and the statistical characteristic are associated with each situation; wherein the unit for adjusting the geographic selection criterion is formed, depending on the statistical characteristic, to perform the adjusting of the selection parameter depending on the statistical characteristic on the basis of the functional connection defined by the value and/or values associated with the situation.

The present invention is based on the finding that an improved selection behavior and a more universal employability may be achieved in location-dependent information reproduction systems when the geographic selection criterion is adjusted dynamically. According to the invention, the adjustment of the geographic selection criterion is performed depending on a detected kind of movement of the user or a position of the user.

Using a detected kind of movement for the adjustment of the geographic selection criterion takes into account the fact discovered by the inventors that the kind of movement allows to draw conclusions on a situation and/or environment of the user to which, in turn, the geographic selection criterion may be adapted. The expression "kind of movement" means, in the present description, any kind of movement and, particularly, any parameter of movement suitable for describing the movement behavior of the user and allowing conclusions on the environment and/or situation of the user. According to an embodiment of the present invention, the detection of the kind of movement of the user includes the detection of movement parameters, such as the geographic position, the speed and the direction of movement of the user over a certain period of time. From the data resulting from this detection, statistical characteristics or measures are determined, which are selected such that they adopt characteristic and/or distinguishable values for predetermined situations and/or environments so that, from the statistical characteristics, conclusions may be made regarding the situation and/or the environment of the user. Then, depending on the determined statistical characteristics or the situation and/or environment which was concluded, the geographic selection criterion is suitably adjusted, such as a maximum distance that the location of an object may have to the user for the information unit on the object to be reproduced or included in the short list of selections.

The various situations and/or environments of the user which are intended to be taken into account by adjustment of the geographic selection criterion include, in an embodiment of the present invention, for example, such situations as a car driver experiences them during the drive, such as driving in the city, driving on a country road or driving on a highway. Different situations and/or environments of the user require different geographic selection criteria. For example, distant objects may be interesting for a car driver who, due to the reproduced information on this object, could decide to visit the same, wherein experience has shown that the information density along highways is lower anyway; in contrast, information on distant objects may be rather irritating for a car driver driving in city traffic, as experience has shown that the sight distance in the city is very limited, that the probability of the car driver missing the object is very low and that the attention of the car driver in city traffic should not unnecessarily be strained in addition.

Alternatively, the adjustment of the geographic selection criterion is performed depending on a detected position of the user, according to the present invention. The detected position is generally to be understood as any positional information indicating in which environment the user is situated, such as in a city, in a certain city, on a country road, on a certain country road or even in a certain geographic position. According to an embodiment of the present invention, the geographic position of the user is, for example, detected and a map, or the like, is used to look up in which kind of environment the user is situated, such as in an urban area, on a country road or on a highway, with which, in turn, selection criteria may be associated that are adapted to these environments and the corresponding situations which the user, as experience has shown, experiences in them, and to which the geographic selection criterion may be adjusted.

An advantage of the present invention is therefore that the inventive concept for location-dependent information reproduction may be employed in applications in which the user gets into different environments and situations which, in turn, require different geographic selection criteria. Furthermore, users do not have to perform the adaptation themselves, but it is performed automatically.

Another advantage of the present invention is that the user, due to the adjustment of the geographic selection parameter adapted to the environment and situation, is not "bothered" with information on objects whose reproduction does not make sense for the user in this situation and/or environment, which, in turn, will increase the acceptance for information systems based on the inventive principle.

In the case of the adjustment of the geographic selection criterion depending on the movement behavior, another advantage is that it is possible to take the fact into account that, in one and the same environment, such as on the highway, at different points of time, the user experiences different situations, such as a traffic jam or no traffic jam, which, in turn, require different geographic selection criteria.

BRIEF DESCRIPTION OF THE DRAWINGS

Preferred embodiments of the present invention will be explained hereinafter with respect to the accompanying drawings, in which.

DESCRIPTION OF THE PREFERRED EMBODIMENTS

Figure 1:
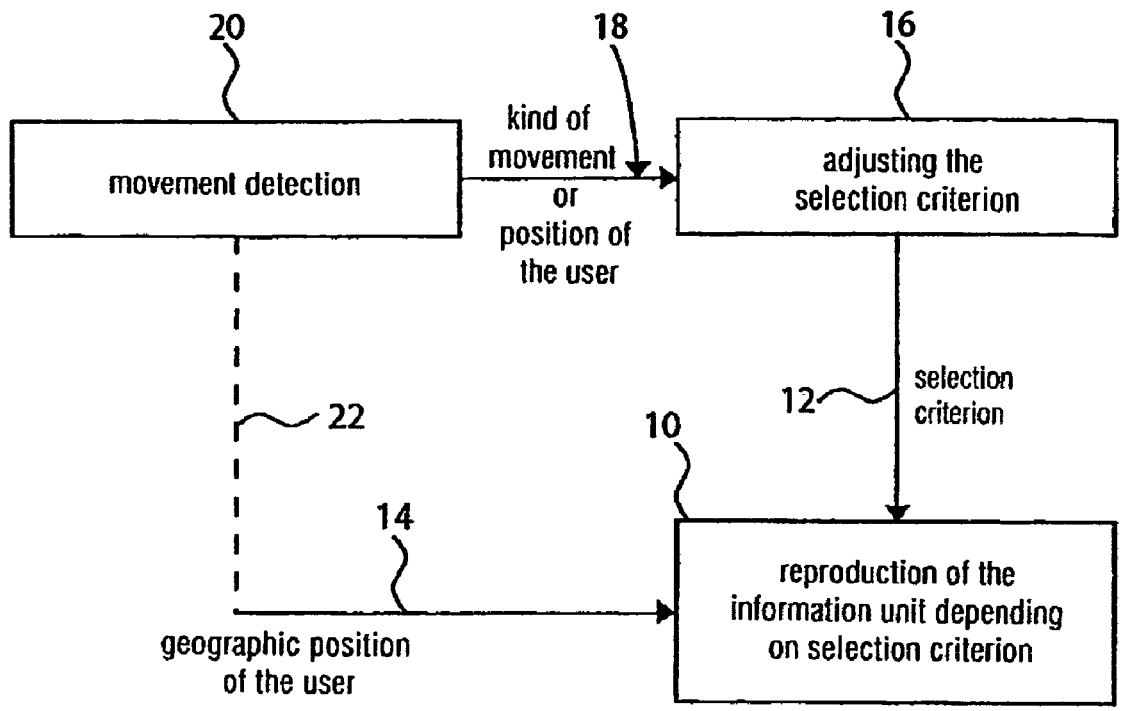
FIG. 1 is a schematic block diagram of an information reproduction method according to an embodiment of the present invention based on which the general principle of the present invention is explained.

With respect to FIG. 1, first the principle of the present invention is described in general based on an embodiment. Although the description of FIG. 1 refers to the individual function blocks as the individual steps of a method, the following discussion may be readily applied to a corresponding device, in which case the individual function blocks of FIG. 1 would represent individual devices for carrying out these functions.

FIG. 1 illustrates a method for providing and/or reproducing an information unit to a user which describes an object situated at a certain location. As can be seen from FIG. 1, the reproduction 10 of the information unit occurs depending on a selection criterion 12 and a geographic position 14 of the user, as it is common in similar systems. The reproduction 10 may occur in any conceivable manner, such as via a loudspeaker, a television set or such devices that address other senses of the user, such as smell producers, tactile devices, or the like. Information units include, for example, information on historical data, cultural data, shopping opportunities, or other information. Examples for objects accordingly include monuments, buildings, or the like. The object, however, may also be the location itself, like in the case when there is no monument reminding of the historical event that happened at a certain location. Furthermore, the location of the object may also have a geographic extension, such as in the case of information on a nature reserve, or the like.

The geographic position 14 of the user may have been detected in any way, such as by a GPS receiver, or the like. The geographic position 14 has a predetermined spatial relationship to the location of the information unit, such as a certain distance to the object which, in turn, may be determined via a certain functional connection. The reproduction 10 of the information unit only occurs when this spatial relationship of geographic position of the user to the location of the object meets the geographic selection criterion 12, such as staying within a maximum distance to the object. Further embodiments for the geographic selection criterion and the determination as to whether it is met will be described with respect to the following embodiment in the FIGS. 2 to 4.

Unlike conventional information reproduction systems, the geographic selection criterion 12 is subject to an ongoing adjustment 16 in the present invention. This adjustment 16 is intended to take into account the fact that, for different environments and/or situations of the user, different geographic selection criteria may be optimal. In the present invention, the adjustment 16 is performed depending on a kind of movement or the position of the user (generally indicated 18) whose detection is performed in a movement detection 20.

The adjustment 16 of the selection criterion 12 includes, for example, changing a selection parameter defining the selection criterion 12. In this case, the selection criterion is met when a value which may be calculated from the geographic position 14 of the user and the location of the object and which describes the geographic relationship between object and user, such as the distance therebetween, is below or exceeds the geographic selection parameter, for example falls below a maximum distance. Alternatively, the adjustment 16 could also include changing from one selection criterion type to another, such as from staying within a maximum distance to the selection criterion that the object is situated at a predetermined solid angle relative to the geographic position and the direction of movement of the user. Furthermore, the adjustment 16 could also include the adjustment of several selection parameters, as is the case in the embodiment described with respect to FIGS. 2 to 4.

In the case that the kind of movement 18 is detected in the movement detection 20, it includes the detection of movement parameters describing the movement behavior of the user, such as the geographic position, the speed and/or the direction of movement of the user over a certain period of time. Depending on this temporal behavior of the movement parameters, the adjustment 16 of the geographic selection criterion is performed. As will be described in more detail with respect to the embodiment of FIGS. 2 to 4, statistical characteristics may be, for example, calculated for this from the movement parameters describing the movement behavior of the user, which are selected such that they are characteristic for predetermined situations and/or environments of the user, such as for driving in a city, on a country road or on a highway. Based on these statistical magnitudes, the adjustment 16 may be performed via a functional connection or by means of a connection between the statistical characteristics and predetermined selected situations and circumstances on the one hand and an association between these predetermined situations and/or circumstances and selection parameters optimally adapted thereto on the other hand.

In the case where the adjustment 16 depends on the position of the user 18, the positional information from the movement detection 20 may include any information where the user is situated, such as at a certain geographic position, or the information in which environment the user is situated, if it is provided, for example, by a location detection device or a mobile phone, or the like. In the case as first mentioned, the adjustment 16 is performed by looking up in a geographic map in which predetermined selection parameters optimally adapted to these regions are associated with certain areas and/or regions. Examples for regions are, for example, cities, country roads or highways, wherein correspondingly adapted geographic selection parameter sets are associated therewith (for example, a larger maximum distance in a highway region and a smaller one in a city region). In the case as last mentioned, in which the movement detection 20 directly outputs the environment of the user, such as the information that the user is situated on a country road, the adjustment 16 is performed directly via looking up in a look-up table in which an optimal geographic selection criterion is associated with each type of environment.

Figure 4:
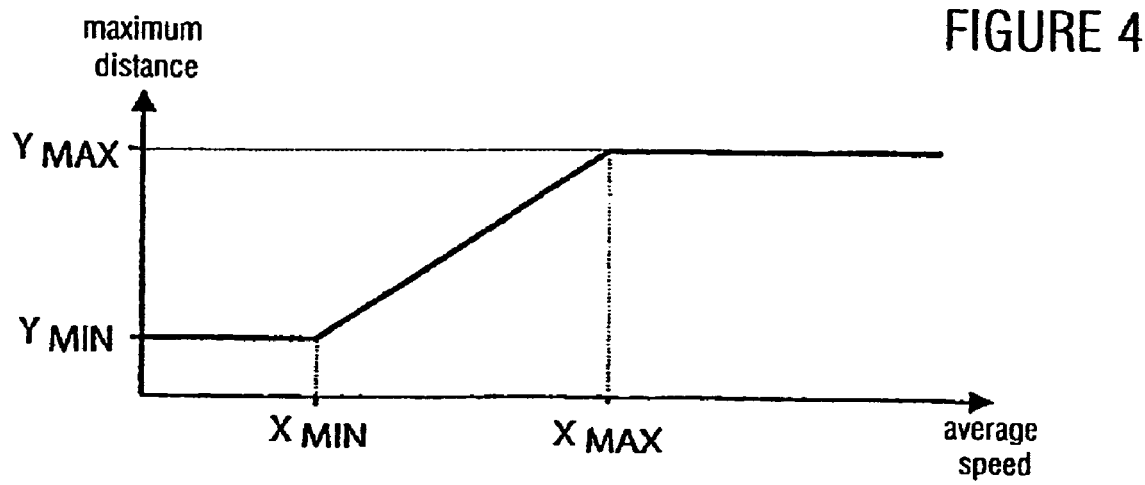
FIG. 4 is a schematic illustration of a function between the average speed and the maximum distance as an example for a function between the detected kind of movement and a geographic selection parameter as used in the embodiment of FIG. 2.
Figure 2:
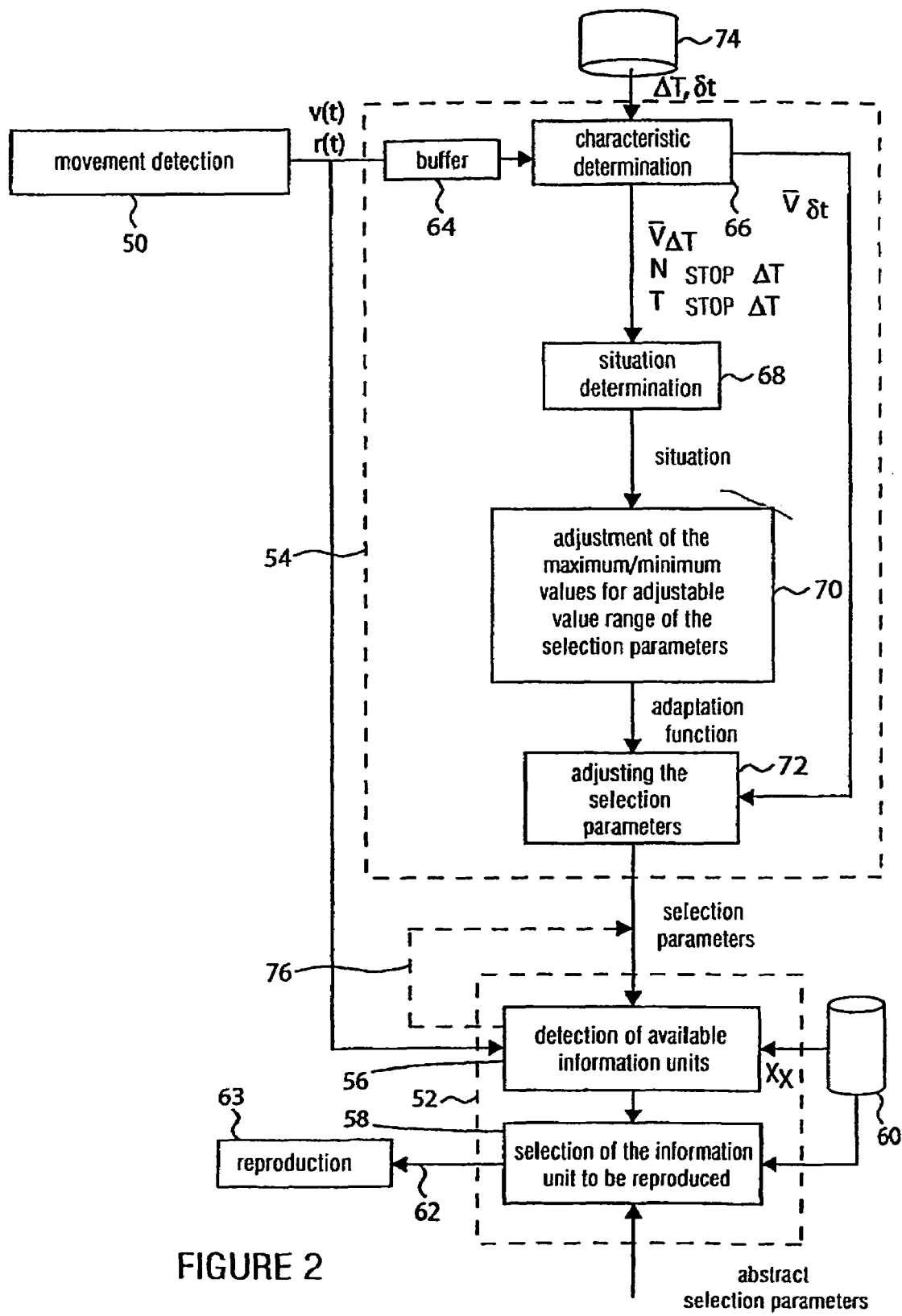
FIG. 2 is a schematic block diagram of an information reproduction device according to an embodiment of the present invention in which an adjustment of geographic selection criteria is performed depending on the movement behavior of the user.
Figure 3:
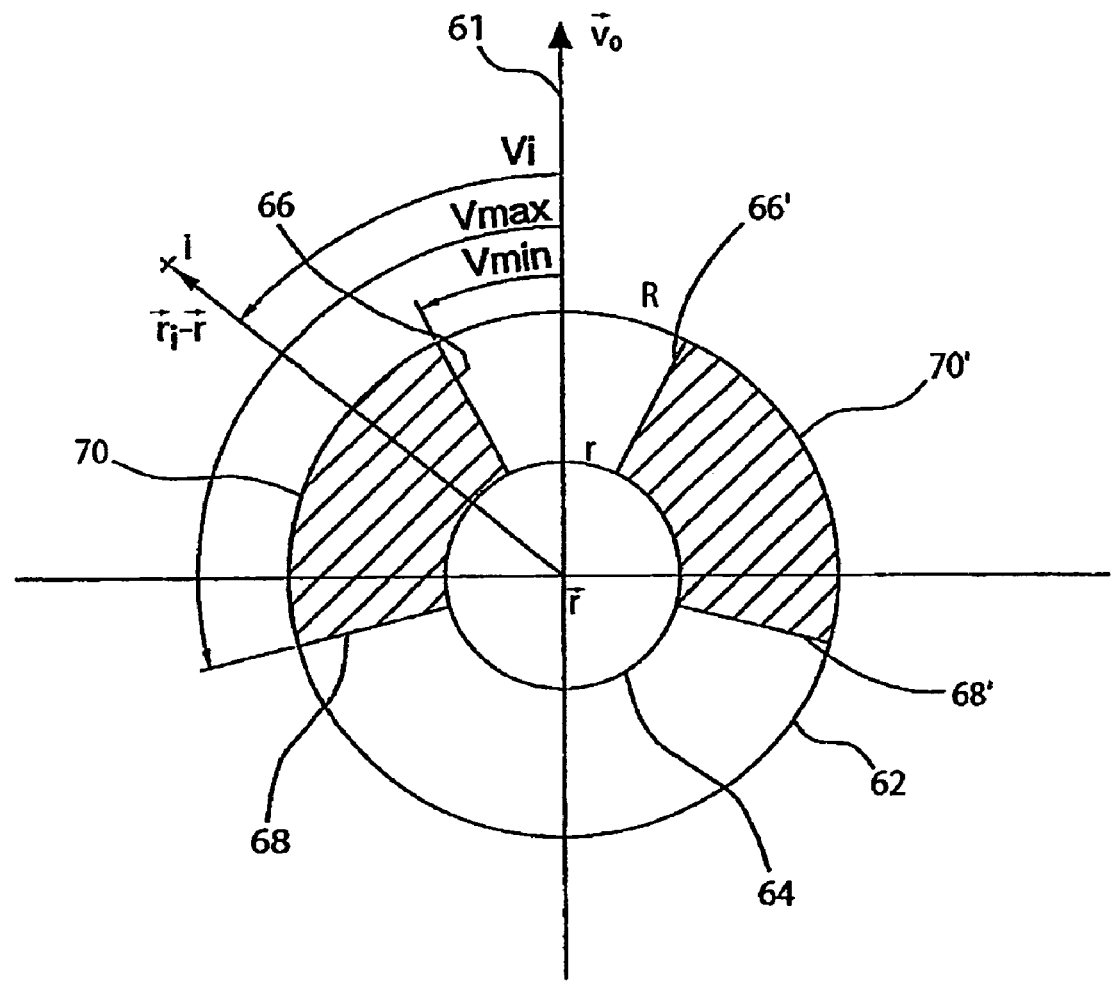
FIG. 3 is a schematic drawing based on which the adjustable geographic selection criteria according to the embodiment of FIG. 2 are illustrated.

Before a specific embodiment is described with respect to FIGS. 2 to 4, in which the adjustment 16 is performed depending on the kind of movement 18, it is to be noted that, according to a further embodiment, the adjustment 16 may actually also be adjusted depending both on the kind of movement and the position of the user 18, such as when the adjustment 16 is performed depending on the position of the user, when the movement behavior of the user described by the kind of movement is not sufficient for concluding a current environment and/or situation.

It further is to be noted with respect to FIG. 1 that the movement detection 20 may, for example, be performed by the same device that outputs the geographic position 14 of the user, such as by a GPS receiver. In order to allow the detection of the kind of movement 18, the movement behavior, and/or the temporal behavior of the movement parameters to be detected, from a position determination unit, an additional buffer may be used for movement detection 20, which stores detected movement parameters for a certain period of time to provide them for the adjustment 16 of the geographic selection criterion, as is also the case in the embodiment described in the following. The fact that the device used for the movement detection 20 or the output of the geographic position 14 may be one and the same has been illustrated by the broken line 22 in FIG. 1.

With respect to FIGS. 2, 3 and 4, an embodiment for a location-dependent information reproduction of one of a plurality of information units is described in the following, in which the adjustment of the geographic selection criteria is performed based on a detected kind of movement of the user. Unlike in the description of FIG. 1, referring to FIG. 2, the function blocks illustrated there are referred to as units of an information reproduction device carrying out the corresponding functions, wherein, however, an application of the following discussion to a corresponding methodic flow with corresponding methodic steps is readily possible.

The device for reproduction of information illustrated in FIG. 2 includes a movement detection unit 50, a selection unit 52 and a selection parameter adjustment unit 54. The movement detection unit 50 is connected to the units 52 and 54 to output current measurements with respect to the movement of the user intermittently to the same, which include the time of the measurement and/or detection t, the geographic position of the user $\vec{r}$ at the time of detection, the speed v at the time of detection and the direction of movement $\vec{v}_0$ at the time of detection. The selection parameter adjustment unit 54 uses this information for the adjustment of selection parameters which it outputs to the selection unit 52. The selection unit 52, in turn, uses the received selection parameters for selecting the information unit to be reproduced.

The movement detection unit 50 is, for example, a GPS receiver intermittently outputting the geographic position of the user. Speed, acceleration and/or direction change sensors may be provided in the movement detection unit 50 to provide the information regarding the speed and the direction of movement of the user. Alternatively, a unit may be provided which calculates the speed and direction information from two or more successive pieces of geographic position information of the GPS receiver or any other position detection unit. In the case that, due to shadowing of the GPS signal, no measurement of a particular movement parameter, such as position, speed or direction of movement, can be delivered longer than a certain maximum duration, corresponding data are extrapolated and/or calculated, for example, from old or the respective other data.

The selection unit 52 includes a unit for detecting available information units 56 for carrying out a first selection stage according to geographic criteria, and a unit 58 for selecting the information unit to be reproduced from the plurality of available information units for carrying out a second selection stage according to abstract selection criteria. The unit 56 receives and uses the information provided by the movement detection unit 50 regarding the current geographic position $\vec{r}$ and direction of movement $\vec{v}_0$ of the user. The unit 56 receives the currently adjusted selection parameters, which will be explained in more detail with respect to FIG. 3, from the selection parameter adjustment unit 54. From a memory 60 including, for example, a working memory, a hard disk, a magnetic memory and/or a CD-ROM, the unit 56 receives and uses information concerning the locations $\vec{r}_i$ of all objects described by the information units i stored in the memory 60.

It is to be noted at this point that, for simplification of the present description, the information units and the locations $\vec{r}_i$ of the objects described by them are illustrated as stored in a single memory 60, although preferably the data actually containing information, such as image data, sound data, or the like, are provided in another memory or in another manner than the locations $\vec{r}_i$ of the objects described by them, such as via the Internet. Preferably, each information unit consists of an administration part which, besides the location of the object described by the information unit, contains further information describing the information unit and is preferably stored in a fast memory, such as a RAM, during operation, and a part containing the actual information on the object which is stored, for example, on a CD or is accessible on a Web site, and to which the administration part contains a reference, such as a directory path or an Internet address.

The unit 56 for the detection of available information units goes through the list of all information units, i.e. all i, to determine those information units that describe objects whose locations $\vec{r}_i$ have such a spatial relationship to the geographic position of the user that the selection criterion is met, as it is defined by the geographic selection parameters from the selection parameter adjustment unit 54.

In order to explain the selection process of the unit 56 in more detail, reference is temporarily made to FIG. 3, in which, by means of a draft, the selection parameters are illustrated which define the selection criterion and/or criteria that is and/or are finally used for the decision as to whether the location of an object has such a spatial relationship relative to the user that the selection criterion is met. With an arrow 61, FIG. 3 indicates the movement direction vector $\vec{v}_0$ as it is obtained from the movement detection unit 50. The movement direction vector 61 starts at a point which corresponds to the geographic position $\vec{r}$ of the user as it is obtained from the movement detection unit 50. Furthermore, two circles 62 and 64 arranged concentrically around the location $\vec{r}$ are illustrated in FIG. 3, which have a radius of R and/or r. Further, two lines radiating radially from the point $\vec{r}$ are shown mirror symmetrical to the movement direction 61, which subtend an angle $\theta_{min}$ with the movement direction 61, as well as two radial symmetrical lines 68, 68' subtending an angle $\theta_{max}$ with the movement direction 61. A hatched area 70 is defined by the lines 66, 68 and the circle lines 62 and 64, which, with respect to the movement direction 61, is mirror symmetrical to an area 70' subtended by the lines 66', 68' and the circles lines 62 and 64.

The selection parameters output by the selection parameter adjustment unit 54 to the unit 56, which the unit 56 uses for the selection as a first stage in the selection process of the selection unit 52 are the maximum distance R,
the minimum distance r,
the lower aperture angle limit $\theta_{min}$, and
the upper aperture angle limit $\theta_{max}$.

An object i with the geographic position $\vec{r}_i$ and a relative aperture angle $\theta_i$ to the geographic position of the user $\vec{r}$ therefore only meets the selection criteria defined by the selection parameters listed above, when the following inequations $|\vec{r}_i - \vec{r}| < R$, $|\vec{r}_i - \vec{r}| > r$, $|\theta_i| > \theta_{min}$ and $|\theta_i| < \theta_{max}$ are met (wherein $\theta_i \in \{-\pi; \pi\}$).

All locations meeting all selection criteria are located in the hatched areas 70 and 71.

Returning to FIG. 2, as first stage of the selection process of the selection unit 52 for the selection of the information unit to be reproduced, the unit 56 accordingly outputs the information to the unit 58 which information units i describe objects situated at locations which meet all selection criteria defined by the selection parameters from the unit 54 relative to the geographic position of the user and his/her direction of movement, i.e. are located at locations in the areas 70 or 71 (FIG. 3).

The first stage of the selection process of the selection unit 52 implemented by the unit 56, which is directed at geographic selection criteria, is followed by a second stage of the selection process performed by the unit 58 and based on abstract selection criteria. The second stage of the selection process is provided so as not to make an arbitrary selection from the, in some cases, several information units which have met the geographic selection criteria, but a selection adapted to the taste of the user. For this, the unit 58 further obtains further information with respect to the information units given by the unit 56 from the administration parts stored in the memory 58, such as category information, e.g. history, geography, etc., information on importance, or the like. Further, the unit 58 obtains the abstract selection parameters determining the abstract selection criteria, such as selection parameters determining a hierarchy with respect to the existing categories to take into account the taste and the preferences of the user in the selection from the information units meeting the geographic selection criteria, and the like. In the case that, after the application of the geographic selection criteria by the unit 56 and the application of the abstract selection criteria by the unit 58, more than one information unit meets all these criteria, the unit 58 selects one information unit to be reproduced arbitrarily or according to other criteria, such as the shortest distance of the object described by the information unit to the user, and outputs a signal indicating this information unit at an output 62 to a reproduction unit 63, such as a loudspeaker, headphones or devices addressing other senses.

As has been described above, in order to pass the first stage of the selection process, an information unit has to meet the geographic selection criteria, as they have been explained with respect to FIG. 3. The hatched areas 70 and 71 illustrated in FIG. 3, which represent the locations meeting these geographic selection criteria, however, are not equally well suited for every car driver situation, for example. As can be seen, the maximum aperture angle $\theta_{max}$ is more than 90° in the case of FIG. 3. Such an adjustment would be a value too large in city traffic because, due to the increased attention they have to pay to the traffic, it would be too much for car drivers to be informed about objects behind them and to be distracted thereby.

To allow the currently adjusted geographic selection parameters to be adjusted and/or readjusted, the selection parameter adjustment unit 54 is provided, which is described in the following. The unit 54 includes a buffer 64 connected to the output of the movement detection unit 50, a characteristic determination unit 66, a situation determination unit 68, a coarse adjustment unit 70 and a fine adjustment unit 72, which are all connected in series between the movement detection unit 50 and the selection unit 52.

The buffer 64 first receives the movement parameter measurements $\vec{r}(t)$ and $\vec{v}(t)$ at the time t output intermittently by the movement detection unit 50. These magnitudes are stored in the buffer 64 in a FIFO (first-in-first-out)

manner to provide data on the movement behavior of the user over a certain time period which is substantially defined by the size of the buffer and/or the storage capacity and the average measuring interval time period between successive measurements as well as by the accuracy of the measured values and the storage format. Illustratively, the measure data occur in the buffer 64 in the following form:

$$\{t_{i-1}, \vec{r}(t_{i-1}), \vec{v}(t_{i-1})\}, \{t_i, \vec{r}(t_i), \vec{v}(t_i)\}, \{t_{i+1}, \vec{r}(t_{i+1}), \vec{v}(t_{i+1})\}$$

wherein i is an index corresponding to a position within the buffer.

The characteristic determination unit 66 has access to the memory contents of the buffer 64 to calculate statistical characteristics from the data provided there based on default calculation functions. The unit 66 determines these statistical magnitudes based on the movement parameter measurements in the buffer 64 for two different time periods Δt and δt whose values it obtains from a memory 74. The time values Δt und δt stored in the memory 74 accordingly determine the time periods of time windows with respect to which the unit 66 calculates statistical characteristics. The statistical characteristics referring to the longer time window Δt represent long-term characteristics of the bahavior of the user and, as will be discussed in the following, are used by the situation determination unit 68 to determine a situation of the user. The statistical characteristics calculated with respect to the shorter time window δt represent short-term characteristics of the driving behavior of the user and are used by the fine adjustment unit 72, as will be discussed in more detail in the following.

As a first statistical characteristic, the unit 66 determines the average speed with respect to the time windows Δt and δt from the movement parameter measurements contained in these windows, which are stored in the buffer 64. The average speed $\bar{v}$ is calculated by:

$$\bar{v} = \frac{v_1 + v_2 + v_3 + \ldots + v_n}{n} \left[\frac{m}{s}\right],$$

wherein $$v_i = \left[\frac{m}{s}\right]$$

are the speed measurements in the buffer 64 which are contained in the corresponding time window Δt and/or δt, the index i indicates the position within the buffer, and n is the number of all measurements contained in this time window.

A second statistical magnitude is the number of stops within a time window, i.e. the number of times in which the speed has dropped to zero ($N_{stop}$).

As a further statistical characteristic, the unit 66 determines the time percentage that the user was standing relative to a given time window. This time percentage T is calculated by $$\bar{T} = \frac{T_1 + T_2 + T_3 + \ldots + T_n}{T_w}[\%],$$

wherein $T_i$ [s] is the time intervals between two movement parameter measurements of the movement detection unit 50, i.e. $T_i = t_i - t_{i-1}$ (using the above notation for illustration of the buffer storage), and $T_w$ [s] is either Δt or δt, i.e. the duration of the time window.

As the statistical characteristic characterizing the steering behavior of the user, the unit 66 determines an average absolute amount rotation angle $\bar{A}$. The calculation may be performed in two different ways. According to the first, $\bar{A}$ is calculated by $$\bar{A} = \frac{\frac{A_1}{T_1} + \frac{A_2}{T_2} + \ldots + \frac{A_n}{T_n}}{n} \cdot T_w[°],$$

wherein $T_i$ [s] are the time intervals between two successive movement parameter detections, $T_w$ [s] is the time period of the given time window, i.e. Δt or δt, $A_i$ [°] is the difference in direction between two successive movement parameter measurements and/or the angle between two successive movement measurements $\vec{v}(t_i)$ and $\vec{v}(t_{i-1})$, and n indicates the number of all position data in the respective time window.

The $\bar{A}$ calculated in the second way is calculated by $$\bar{A} = \frac{\frac{A_1}{T_1} + \frac{A_2}{T_2} + \ldots + \frac{A_n}{T_n}}{n} \left[\frac{°}{s}\right],$$

wherein $T_i$ [s] is the time intervals between two successive movement parameter measurements, $A_i$ [°] is the direction difference interval between two successive movement parameter measurements, and n is the number of all position data detected in the respective time window.

A single addend in the numerator of the characteristics $\bar{A}$ mentioned last characterizing the steering behavior of the user is the larger, the larger is the direction difference of successive movement parameter measurements and the smaller is the time interval therebetween, which is, in turn, a measure for the steering intensity and/or the steering degree. Further characteristics which can be calculated could also be determined by the unit 66.

The unit 66 outputs the calculated statistical characteristics with respect to the longer time window Δt to the situation determination unit 68. The situation determination unit uses heuristically determined limits to determine, based on the statistical characteristics from the unit 66, in which situation the user currently is. For this, limits for every preset situation, such as driving in a city, driving on a country road, driving on a highway, are stored in the look-up table (not shown), which determine which values the characteristics have to have for the corresponding situation to be detected. Accordingly, a value range for every used statistical characteristic which it receives from the unit 66 is contained in the look-up table for every preset situation.

According to an embodiment, the situation determination unit 68 uses three statistical characteristics for the determination of the current situation which the user is in, namely the average speed, the number of stops and the time percentage of the stops $\bar{T}$ in the time window Δt. Corresponding to the three situations "city", "country road" and "highway" preset as an example, three value ranges are respectively associated with the respective statistical characteristics:

There is a driving situation "city", if $$0 \leq \overline{v} \leq 35 \left[\frac{km}{h}\right];$$

$$3 \leq N_{stop}; \ 10\% \leq \overline{T};$$

there is a driving situation "country road", if $$35 \leq \overline{v} \leq 80 \left[\frac{km}{h}\right];$$

$$0 \leq N_{stop} \leq 3; \ 0\% \leq \overline{T} \leq 10\%$$

there is a driving situation "highway", if $$80 \leq \overline{v} \left[\frac{km}{h}\right];$$

$$N_{stop}=0; \ \overline{T}=0\%$$

Further situations may readily be added to the look-up table of the situation determination unit 68. It is to be noted that it is advantageous when the value ranges characterizing the preset situations are selected such with respect to the statistical characteristics for the individual preset situations that they allow a unique determination of one of the preset situations based on the statistical characteristics and/or result in a unique association between characteristic set and preset situation. Otherwise appropriate rules must be laid down which of two or more possible preset situations is to be selected by the determination unit 68.

The situation determination unit 68 may readily be changed to determine the selection of the preset situations from further statistical characteristics. Likewise, further preset situations may be added, such as "traffic jam", or the like. Limits are associated with each new preset situation which define the value range with respect to each statistical characteristic used by the unit 68, wherein they are stored in the look-up table.

After the situation determination unit 68 has determined the situation and/or environment of the user based on the statistical characteristics, it passes the information thereon on to the coarse adjustment unit 70 which, based on this information, looks up in the same look-up table as that of the unit 68 or in a separate look-up table (not shown) to obtain values defining the minimum and maximum values for the fine adjustment by the fine adjustment unit 72 and determining a functional connection between statistical short-term characteristics determined by the characteristic determination unit 66 and the geographic selection parameters, as will be explained in the following with respect to FIG. 4.

More specifically, the values looked up by the coarse adjustment unit 70 determine functions of a specific type which determine a functional connection between a statistical characteristic determined with respect to the short time window and a geographic selection parameter. Due to its function type, each function f(x) is uniquely defined by four values $x_{min}$, $x_{max}$, $y_{min}$ and $y_{max}$ and consists of three adjacent portions, namely two constant function portions and an intermediate, linearly increasing or decreasing function portion. More specifically, each function f(x) is defined by the following equation:

$$f(x) = \begin{cases} y_{min} & x \leq x_{min} \\ y_{min} + \frac{(y_{max} - y_{min}) \cdot (x - x_{min})}{x_{max} - x_{min}} & x_{min} \leq x \leq x_{max} \\ y_{max} & x_{max} \leq x \end{cases}$$

The above equation applies to a function of the increasing type, as it is shown by way of example in FIG. 4 for the connection between the average speed and the maximum distance. The function equation for a corresponding decreasing function is calculated from the values looked up by the unit 70 as follows:

$$f(x) = \begin{cases} y_{max} & x \leq x_{min} \\ y_{max} + \frac{(y_{max} - y_{min}) \cdot (x - x_{min})}{x_{max} - x_{min}} & x_{min} \leq x \leq x_{max} \\ y_{min} & x_{max} \leq x \end{cases}$$

wherein, in the formulas above, f(x)=y corresponds to the geographic selection parameter and x corresponds to the statistical characteristic determined over the small time interval δt, as the fine determination unit 72 receives it from the characteristic determination unit 66.

In the look-up table of the unit 70, exactly one set of values is stored for each geographic selection parameter, which determines a function determining a functional connection between a statistical characteristic determined from a short time window δt and the respective geographic selection parameter. Of course, other functional connections and/or other functions could also be used, which depend on more than one statistical characteristic. A function F(x1, x2) corresponding to the function shown in FIG. 4, depending on two statistical characteristics x1 and x2 could, for example, be determined by six values $x1_{min}$, $x2_{min}$, $x1_{max}$, $x2_{max}$, $y_{min}$ and $y_{max}$.

With respect to FIG. 4, the purpose of the coarse adjustment by the coarse adjustment unit 70 and the co-operation with the fine adjustment by the fine adjustment unit 72 is explained by way of example based on the maximum distance as an example for a geographic selection parameter.

For the fine adjustment of the maximum distance (referred to as R in FIG. 3), the average speed during the time window δt is used. Accordingly, the coarse adjustment unit 70 determines a function between these two magnitudes, as it is shown in FIG. 4, in which the average speed is put down along the x-axis and the maximum distance is put down along the y-axis. The determination of the function of FIG. 4 is done by the values $x_{min}$, $x_{max}$, $y_{min}$ and $y_{max}$ looked up by the unit 70. The function illustrated in FIG. 4 thus represents the adaptation function based on which the fine adjustment unit 72 performs the fine adjustment of the maximum distance by putting the average speed obtained by the characteristic determination unit into the above formula for increasing functions as function value x and using the looked up values $x_{min}$, $x_{max}$, $y_{min}$ and $y_{max}$.

As can be seen, the function is selected such that the fine adjustment by the fine adjustment unit 72 is limited by the same to an area [$x_{min}$; $x_{max}$] on the one hand and a value range [$y_{min}$; $y_{max}$] on the other hand. In other words, although the definition range of the function and/or fine adjustment function reaches from minus infinite to plus infinite, the function value to which the fine adjustment limits the corresponding geographic selection parameter is constant outside the area [$x_{min}$; $x_{max}$]. These limitations, in turn, are different for each pre-defined situation. For example, the maximum distance R (FIG. 3) should not be too large in the situation "city", so that, here, there is a maximum value $y_{max}$ for its adaptation in the fine adjustment. This maximum value will be smaller than for the case "highway". In addition, there is a maximum value $x_{max}$ with respect to the average speed up to which an adaptation is performed in the fine adjustment. The reason for this is that a high speed is a special exceptional situation in the situation "city" and that, in this case, the maximum distance R should not be adapted so far.

Exemplary values for $x_{min}$, $x_{max}$, $y_{min}$ and $y_{max}$ for the functional connection between the maximum distance and the average speed $\overline{v}$ for the exemplary situations "city", "country road" and "highway" are:

TABLE 1

|  | $x_{min}$ [km/h] | $x_{max}$ [km/h] | $y_{min}$ [m] | $y_{max}$ [m] |
| --- | --- | --- | --- | --- |
| city | 0 | 50 | 100 | 300 |
| country road | 20 | 100 | 300 | 1,000 |
| highway | 60 | 200 | 1,500 | 4,000 |

The coarse adjustment unit 70 passes the adaptation function defined by the set of the looked up values $x_{min}$, $x_{max}$, $y_{min}$ and $y_{max}$ on to the fine adjustment unit 72 which, in addition, obtains those statistical characteristics with respect to the short time window from the characteristic determination unit 66 with respect to which the adaptation functions of the individual geographic selection parameters are defined, such as, in the case of FIG. 4, the average speed $\overline{v}_{\delta t}$ determined with respect to the short time window $\delta t$. Examples for further pairs of a selection parameter and a statistical characteristic for a functional connection include, for example, the pair of minimum distance r and average speed $\overline{v}_{\delta t}$, the pair $\theta_{min}$ and T [°/s] and the pair $\theta_{max}$ and T [°/s]. Based on the respective adaptation function, the fine adjustment unit 72 determines each geographic selection parameter as function value of this function at the respective ordinate and/or the value of the corresponding statistical characteristic. If the average speed in the exemplary example of FIG. 4 is, for example, between $x_{min}$ and $x_{max}$, as they were looked up by the unit 70 by the situation determined by the unit 68, the fine adjustment unit 72 adjusts the maximum distance to the corresponding function value between $y_{min}$ and $y_{max}$, which also depend on the situation determined by the situation determination unit 68 and were looked up in a look-up table by the coarse adjustment unit 70 (compare the above table).

The adjustment unit 72 finally outputs the geographic selection parameters determined according to the functional connection to the selection unit 52 which, in turn, as described above, performs the first stage of the selection process with respect to the information units based on these parameters.

The adjustment of the geographic selection parameters depending on the driving behavior, performed by the selection parameter adjustment unit 54 ensures that the geographic selection parameters are always adapted to the situation and/or environment of the user and that the selection process of the selection unit 52 thus makes a selection as useful as possible. If, for example, the user drives slowly, it is to be assumed that his physical situation or physical context forms obstacles that do not allow him to drive faster and, in this case, only objects close by are relevant for him. In the case where a user drives along a highway, an object in a city close by (1 km) is relevant for him, because he could decide to visit it. Then he leaves the highway and drives into the city, wherein the driving speed decreases. When he is in the city, only objects within a short distance are relevant for him and he should not be informed about objects which are distant (for example, 5 km).

Two conclusions become clear from this case study, which are taken account of by the mode of operation of the selection parameter adjustment unit 54 described above. On the one hand, the driving behavior of the user allows to detect which situation and/or environment the user is in (slow driving in a city, faster driving on the highway). This finding is taken into account by the units 66 and 68 which determine together, based on the information provided by the movement detection unit 50, as to what the situation is.

A second conclusion is that, in various situations and/or environments, the user is interested in objects which, depending on the situation and/or environment, are more or less distant (more distant ones on the highway, less distant ones in the city). This finding is taken into account by the units 70 and 72 which, together, perform the adjustment of the selection parameters.

A broken line 76 in FIG. 2 which, starting from the unit 56 for the detection of available information units based on the selection parameters, forms a feedback loop is intended to indicate that it may be provided that for the case that the selection parameters determine too strict selection criteria and, thus, only few or no information units meet the geographic selection criteria, the geographic selection parameters adjusted by the selection parameter adjustment unit 54 may be changed stepwise to ease and/or relax the geographic selection criteria defined by the same stepwise. Illustratively, the hatched area in FIG. 3 (70, 70') is enlarged stepwise hereby to increase the amount of information units passing the first stage of the selection process of the selection unit 52. A limit for this stepwise relaxation of the geographic selection criteria could, for example, be formed by the upper limits of the value ranges and/or $y_{max}$, as described with respect to FIG. 4. In this way, further adaptation of the geographic selection parameters is performed, namely to the distribution of the objects described by the existing information units and/or the distribution of all $\vec{r}_j$. If the distribution in the environment of the geographic position of the user is too low, the selection parameters are changed stepwise to relax the geographic selection criteria.

With respect to the embodiment of FIG. 2, the following is to be noted. With respect to the determination of the movement characteristics describing the average movement behavior of the user, more than just the two described time windows with different time periods $\Delta t$ and $\delta t$ could be used, such as three time windows, one for a short, one for a medium and one for a long time range. While the longer time ranges are more suitable to determine the situation and/or environment of the user, as performed by the situation determination unit 68, the shorter time windows are more suitable for the fine adjustment by the fine adjustment unit 72 to take into account current driving maneuvers in the bounds given by the coarse adjustment.

Furthermore, the limits $y_{min}$ and $y_{max}$ (FIG. 4) of the geographic selection parameters could also be calculated by continuous functions instead of depending on the zone type previously derived and/or the situation previously derived, based on a look-up table, without a situation actually being determined.

A concrete possibility of the usage of the device of FIG. 2 is, for example, as indicated above, a mobile information system reproducing selected information on surrounding objects to a car driver during the journey. By means of GPS, the system determines the current location and the direction of movement and the speed of the user. The system selects an information unit regarding an object when the location of the object meets given geographic selection criteria determined by the geographic selection parameters.

By the adaptation algorithm implemented by the selection parameter adjustment unit 54, as described above, these geographic selection criteria and/or their corresponding selection parameters are now adapted dynamically to the physical context and/or the situation or environment of the user. As described with respect to FIG. 4, a possible adaptation of a selection criterion consists, for example, in changing the maximally allowable distance of an object depending on the average speed of the user. If the user drives faster, the selection range is extended to allow also selecting more distant information units. For this, an adaptation function (FIG. 4) is used, having a defined value range between a minimum and a maximum value ($y_{min}$, $y_{max}$). The limits are determined or calculated prior to this by the evaluation of other characteristics and also other time windows by the coarse adjustment unit 70.

In addition to the characteristics described with respect to the characteristic determination unit 66, statistical variations, such as standard variation or variance, within the considered time window of the movement parameters detected by the movement detection unit 50 could further be used as statistical characteristics.

With respect to the implementation of the device of FIG. 2, it is to be noted that it may be realized both in software, hardware and mixed, in firmware. With respect to the selection parameter determination unit 54 and the selection unit 52, it is to be noted that they operate independently of each other to iterate processing as, for example, each time when a new movement parameter measurement is output by the movement detection unit 50. The iteration of the two units, however, is independent of each other and they could, for example, be implemented as independent software subprograms. The selection unit then accesses the currently adjusted selection parameters via, for example, specifically provided common registers in which the selection parameter unit intermittently enters changed selection parameters. The units within the selection parameter adjustment unit 54 may also comprise different iteration cycles. The fine adjustment unit 73, for example, may comprise a faster iteration frequency than is the case for the part up to the coarse adjustment unit 70.

Finally, it is to be noted with respect to FIG. 2 that the division into a coarse and fine adjustment only represents a specific embodiment, and that the geographic selection parameters could further be adjusted directly via functional connections from the statistical characteristics.

The above embodiment of FIG. 2 accordingly provides an algorithm for the dynamic automatic adaptation of a system for the location-dependent reproduction of information fitting the physical context of the user. The system uses several selection criteria to select which information is to be reproduced with priority. In addition, the system changes the geographic selection criteria of the system automatically depending on the physical environment and the behavior of the user. The physical environment contains information on the distribution of the available information units and on the type of the geographic zone in which the user is moving. The adaptation algorithm evaluates the movement behavior of the user to derive the geographic zone and to change the geographic selection parameters correspondingly.

In other words, the above embodiment thus allows the dynamic adaptation of the geographic selection parameters of an information system to the physical environment of the user who moves dynamically. Among other things, the algorithm evaluates the dynamically changing user locations and decides correspondingly which values for the geographic selection parameters are currently most suitable for the current user situation.

The algorithm evaluates position information, which is detected by an external source. This position information contains the current location of the user, information on the direction of movement and speed. By the timed evaluation of the position information, the algorithm calculates several characteristics describing the average movement behavior of the user. The movement characteristics are calculated for several time windows. The number and duration of the time windows are arbitrary. Subsequently, the algorithm evaluates the movement characteristics per time window to calculate the currently valid minimally/maximally allowable limits for all required selection parameters. A geographic zone type (above referred to as situation) in which the user is currently moving may, for example, also be derived by this evaluation. Here, the limits of the selection parameters may be determined depending on the zone type previously derived or may also be calculated by continuous functions.

After determining the minimum and maximum limits for each selection parameter, the algorithm determines the actual values of the geographic selection parameters by a detailed evaluation of the movement characteristics, wherein the value range for the adjustment of the geographic selection parameters is limited by minimum/maximum limits calculated previously.

Finally, the algorithm also evaluates the number and density distribution of the information units available around the user and, if necessary, subsequently again refines the selection parameters.

The advantage of this algorithm implemented by the device of FIG. 2 is therefore that it adapts the geographic selection process of the information system dynamically and automatically fitting the geographic environment and the behavior of the user. The selection of information does not only depend on the locations of the user and the available information units, but also on the freedom of movement of the user and the distribution of the information units. The selection parameters determining the selection behavior of the information system are dynamically adapted all the time so that the selection behavior of the system is adapted in the most optimal way to the current geographic situation and the behavior of the user.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for providing one of a plurality of available information units to a user, wherein the information units each describe an object at a respective location, wherein the method comprises:
   a) detecting a geographic position of the user;
   b) iteratively determining such information units from the plurality of available information units that describe objects situated at locations which have a spatial relationship to the geographic position of the user which meets a geographic selection criterion, selecting an information unit to be reproduced to the user from the determined information units, and reproducing the selected information unit to the user;
   c) depending on a temporal behavior of the geographic position, a speed and/or a direction of movement of the user, adjusting the geographic selection criterion so that a subsequent selection process is performed with a different geographic selection criterion,
   wherein the method further comprises:
   d) prior to step c), detecting the position, speed and/or direction of movement of the user over a time window of predetermined duration to detect the temporal behavior,
   wherein step b) includes selecting those information units that describe objects at locations situated so that a distance of the geographic position of the user from the location of the object or an angle between the direction of movement of the user and a line running through the geographic position of the user and the location of the object is below or exceeds a selection parameter,
   wherein step b) further comprises the following substeps:
   b1) evaluation of the detected temporal behavior in the time window of a predetermined time period to obtain a statistical characteristic or measure; and
   b2) adjusting the geographic selection criterion depending on the statistical characteristic, and
   wherein in step d) the temporal behavior is also determined over a further time window of a further predetermined time period which is longer than the time period of the predetermined time window, and wherein step b) further comprises the following substeps:
   prior to step b2),
      evaluation of the detected temporal behavior in the further time window to obtain a further statistical characteristic which is a further measure for changes in the temporal behavior,
      concluding a situation of the user from a plurality of predetermined situations based on the further statistical characteristic, wherein one or more values defining a functional connection between the selection parameter and the statistical characteristic are associated with each situation;
   wherein the adjustment of step b2) comprises adjusting the selection parameter depending on the statistical characteristic on the basis of the functional connection defined by the value and/or values associated with the situation.

2. The method of claim 1, wherein step c) comprises calculating the speed and/or direction of movement from successively detected geographic positions of the user.

3. The method of claim 1, wherein the values associated with the situation include a selection parameter minimum value and a selection parameter maximum value as well as a characteristic minimum value and a characteristic maximum value, and the functional connection is a function which, from 0 to the characteristic minimum value, adopts the selection parameter minimum value, from the characteristic minimum value to the characteristic maximum value, runs linearly between the selection parameter minimum value and the selection parameter maximum value, and from the characteristic maximum value, adopts the selection parameter maximum value.

4. The method of claim 1, wherein the evaluation of the detected temporal behavior in the further time window is performed such that the further statistical characteristic is selected from a group including the average speed, a statistical variation of the speed, the average degree of changes in direction, the frequency of changes in direction, the frequency of movement stops as well as the average duration of movement stops.

5. The method of claim 1, wherein the evaluation of the detected temporal behavior in the time window is performed such that the statistical characteristic includes the average speed.

6. The method of claim 1, further comprising:
   after step b),
      determining how many of the information units describe an object whose location is located such with respect to the geographic position of the user that the geographic selection criterion is met; and
      relaxing the selection criterion by increasing or reducing the selection parameter, if the determined number is below a predetermined value.

7. A device for providing one of a plurality of available information units to a user, wherein the information units each describe an object at a respective location, wherein the device comprises:
   a) a unit for detecting a geographic position of the user;
   b) a unit for iteratively determining such information units from the plurality of available information units that describe objects situated at locations which have a spatial relationship to the geographic position of the user which meets a geographic selection criterion, selecting an information unit to be reproduced to the user from the determined information units, and reproducing the selected information unit to the user;
   c) a unit for adjusting the geographic selection criterion depending on a temporal behavior of the geographic position, a speed and/or a direction of movement of the user, so that successive selection processes are performed with different geographic selection criteria,
   wherein the unit for detecting is formed to detect the position, speed and/or direction of movement of the user over a time window of predetermined duration to detect the temporal behavior,
   wherein the unit for iteratively determining, selecting and reproducing is formed such that the selection includes selecting those information units that describe objects at locations situated so that a distance of the geographic position of the user from the location of the object or an angle between the direction of movement of the user and a line running through the geographic position of the user and the location of the object is below or exceeds a selection parameter,
   wherein the device further comprises:
   b1) a unit for evaluating the detected temporal behavior in the time window of a predetermined time period to obtain a statistical characteristic; and
   b2) a unit for adjusting the geographic selection criterion depending on the statistical characteristic, and
   wherein the unit for detecting is further formed to determine the temporal behavior also over a further time window of a further predetermined time period which is longer than the time period of the predetermined time window, and wherein the unit for iteratively determining, selecting and reproducing comprises the following units:
a unit for evaluating the detected temporal behavior in the further time window to obtain a further statistical characteristic which is a further measure for changes in the temporal behavior,
a unit for concluding a situation of the user from a plurality of predetermined situations based on the further statistical characteristic, wherein one or more values defining a functional connection between the selection parameter and the statistical characteristic are associated with each situation;
wherein the unit for adjusting the geographic selection criterion is formed, depending on the statistical characteristic, to perform the adjusting of the selection parameter depending on the statistical characteristic on the basis of the functional connection defined by the value and/or values associated with the situation.

* * * * *